US007017995B2

(12) United States Patent
De Nichilo

(10) Patent No.: US 7,017,995 B2
(45) Date of Patent: Mar. 28, 2006

(54) VEHICLE SEAT HAVING A BACKREST LOCKING ASSEMBLY

(75) Inventor: Giovanni De Nichilo, Grugliasco (IT)

(73) Assignee: Lear Corporation, Southfield, MI (US)

( * ) Notice: Subject to any disclaimer, the term of this patent is extended or adjusted under 35 U.S.C. 154(b) by 245 days.

(21) Appl. No.: 10/749,705

(22) Filed: Dec. 31, 2003

(65) Prior Publication Data

US 2005/0146188 A1 Jul. 7, 2005

(51) Int. Cl.
*B60N 2/20* (2006.01)

(52) U.S. Cl. .................................................. 297/378.14

(58) Field of Classification Search ........... 297/378.12, 297/378.14

See application file for complete search history.

(56) References Cited

U.S. PATENT DOCUMENTS 3,736,026 A * 5/1973 Ziegler et al. ......... 297/378.14
4,103,967 A * 8/1978 Tanaka et al. ......... 297/378.11
4,606,577 A 8/1986 Hirama et al. .............. 296/331
4,869,541 A 9/1989 Wainwright ............... 296/65.1
4,919,482 A * 4/1990 Landis et al. .......... 297/378.11
5,052,748 A * 10/1991 Fourrey et al. ........ 297/378.12
5,507,561 A 4/1996 Fourrey et al. ........ 297/378.12
5,593,208 A 1/1997 Mitschelen et al. ......... 297/336
5,871,255 A 2/1999 Harland et al. ............. 297/257
5,938,286 A * 8/1999 Jones et al. ............ 297/378.12
5,941,602 A 8/1999 Sturt et al. .................. 297/340
6,012,755 A 1/2000 Hecht ...................... 286/65.03
6,024,411 A 2/2000 Pesta et al. ................ 297/325
6,039,401 A 3/2000 Rus ....................... 297/378.13
6,048,030 A 4/2000 Kanda et al. ............... 297/341
6,135,555 A 10/2000 Liu et al. .................... 297/336
6,149,235 A 11/2000 Fahim ..................... 297/259.2
6,227,619 B1 5/2001 Pesta et al. ............ 297/378.12
6,250,704 B1 6/2001 Garrido .................. 296/65.05
6,293,620 B1 9/2001 Fast .......................... 297/325
6,345,867 B1 2/2002 Hellrung et al. ............ 297/336
6,402,250 B1 6/2002 Lange .................. 297/378.12

(Continued)

FOREIGN PATENT DOCUMENTS

DE 199 18 785 C1 2/2000

(Continued)

*Primary Examiner*—Peter R. Brown
(74) *Attorney, Agent, or Firm*—Bill Panagos

(57) ABSTRACT

A vehicle seat assembly of the present invention includes a seat backrest, a seat bottom, and a backrest reclining assembly. The backrest reclining assembly has an axis of rotation and includes a base, a rotating latching mechanism, and a reclining arm. The reclining arm is mounted to the seat backrest, the rotating latching mechanism is mounted between the reclining arm and the base such that the reclining arm and the seat backrest may be selectively rotated relative to the base about the axis of rotation. A pivot arm is mounted to the base and has a pivot axis point disposed at a predetermined distance from the axis of rotation of the reclining assembly. A locking arm is rotatively mounted to the pivot arm about the axis of rotation of the reclining assembly. A support arm is mounted to the seat bottom and rotatively mounted to the pivot arm at the pivot axis point, such that the pivot arm and the seat backrest may be rotated about the pivot axis point between an upright position and a folded position. The support arm provides a first locking point such that when the pivot arm and the seat backrest are in the upright position the seat backrest is locked upright. The support arm further provides a second locking point such that when the pivot arm and the seat backrest are in the folded position the seat backrest is locked folded.

14 Claims, 4 Drawing Sheets

U.S. PATENT DOCUMENTS

| | | | | |
|---|---|---|---|---|
| 6,464,299 | B1 * | 10/2002 | Castagna | 297/378.12 |
| 6,511,129 | B1 | 1/2003 | Minor et al. | 297/367 |
| 6,513,873 | B1 | 2/2003 | Tsuda et al. | 297/253 |
| 6,533,341 | B1 | 3/2003 | Marinelli | 296/65.16 |
| 6,669,299 | B1 * | 12/2003 | Carlson et al. | 297/378.14 |
| 6,698,837 | B1 | 3/2004 | Pejathaya et al. | 297/378.12 |
| 6,805,410 | B1 * | 10/2004 | Christoffel et al. | 297/378.12 |
| 6,860,562 | B1 * | 3/2005 | Bonk | 297/378.12 |
| 2002/0113480 | A1 | 8/2002 | Senseby et al. | 297/378.1 |
| 2002/0125757 | A1 | 9/2002 | LeTournoux | 297/378.12 |
| 2002/0135215 | A1 | 9/2002 | Magyar et al. | 297/378.12 |

FOREIGN PATENT DOCUMENTS

| | | |
|---|---|---|
| DE | 102 18 394 A1 | 11/2003 |
| DE | 102 97 476 T5 | 11/2004 |
| WO | WO 99/59836 | 11/1999 |

* cited by examiner

VEHICLE SEAT HAVING A BACKREST LOCKING ASSEMBLY

BACKGROUND OF THE INVENTION

1. Field of the Invention

The present invention relates, generally, to a vehicle seat and, more specifically, to vehicle seat having a backrest assembly that locks the backrest in both an upright and a folded down position.

2. Description of the Related Art

Seat assemblies having reclining or pivoting backrests are a popular component in many automotive vehicles. Seats with pivoting backrests are used commonly in two-door vehicles to provide access to the rear seat. Rear seats in hatchback type, 3 or 5-door vehicles are often designed to pivot forward and fold down flat to provide additional cargo area. In some instances, vehicle seat backrests are designed to both recline for passenger comfort and also fold down for greater storage space. Seats of this type may be installed as a rear seat in a sedan or as the intermediate and/or rear seat of a van or sport utility vehicle. In these types of seating arrangements, the combined reclining and pivoting mechanisms can be quite bulky and cumbersome.

A pivoting vehicle seat backrest requires a pivoting mechanism that allows for the selective forward rotation of the backrest between an upright seating position and a folded-down storage position. The pivot mechanism must have its axis placed so that the seatback will fully fold down upon the bottom seat cushion. Additionally, the pivoting backrest also requires a locking mechanism to secure the backrest in its upright position. The pivoting mechanism is known in the art as a "dumplatch," this term is derived from the act of "dumping" the seatback from the upright position to a forward folded position. A reclining vehicle seat backrest requires a reclining mechanism that allows for the selective rearward rotation of the backrest from the fully upright seating position to any of a variety of more reclined seating positions based on the desires of occupant. The reclining mechanism has its own locking components, which are inherent in the selective positioning structure of the device.

When it is desired to construct a backrest that incorporates both the ability to pivot forward for storage and the ability to recline, a reclining mechanism, a pivoting mechanism, and a pivot locking mechanism must all be included in the seat assembly. The conventional approaches taken to combine these mechanisms have been successful to a point. However, there remains room for improvement. Pivoting and reclining mechanisms have generally remained separate mechanisms in close proximity to each other at the juncture between the seat backrest and the seat bottom. This separation of the mechanisms is generally due to the fact that the axis of rotation for pivoting the seat must be higher and forward of the reclining axis to provide for a more compact size when folded. When a reclining but non-pivoting seat is folded forward about its reclining axis of rotation, the base of the seat backrest and the bottom seat cushion interfere with each other and impede the folding action.

Since the pivoting and reclining mechanisms have generally remained separate components, most of the conventional attempts at improving the design of the backrest of the seat assembly relate to more efficiently incorporating the pivot locking mechanism into the seat assembly. One approach has been to provide separate locking assemblies at the top of the backrest that interact with fixtures on the floor of the vehicle and at an upper locking point in the vehicle pillar area. When upright, this requires the seat backrest to remain in one position or have a limited range of movement, which negates most of the reclining ability. This function typically requires separate components that are vehicle specific and that interfere with passenger ingress and egress to and from the vehicle. In other approaches, the lower locking hardware is omitted to reduce system components and avoid the problems associated with interfering with passenger movement at the floor area. However, omitting the locking mechanism leaves the folded seat backrest unsecured which presents safety issues in the event of an emergency situation, such as a collision or hard braking. Another approach has been to use a dumplatch locking mechanism in which the dumplatch is incorporated into the pivoting mechanism of the seat backrest systems. However, the dumplatch locking assembly of conventional backrest assemblies are typically located forward of the seat pivot point in the seat fold area, which causes them to intrude forward into the seating area, again presenting passenger entry and exit difficulties. The conventional dumplatches also require additional trim pieces to protect the occupants from the mechanism. Furthermore, each of these conventional approaches to improving vehicle seat backrest mechanisms must be specifically tailored to the particular vehicle or a particular vehicle seat, which increases the production costs of the seat.

Therefore, there remains a need in the art for a vehicle seat backrest locking assembly having a pivoting and the reclining mechanism that provides a compact and efficient backrest mechanism and that avoids intruding into the seating area. Additionally, there remains a need for a compact and efficient backrest mechanism that provides reclining, pivoting, and locking features into a universal device that may be employed on a wide variety of vehicle seats and in a wide variety of vehicles.

SUMMARY OF THE INVENTION

The disadvantages of the related art are overcome by the present invention that provides a vehicle seat assembly having a backrest locking assembly. The present invention includes a seat backrest, a seat bottom mounted to the floor of a vehicle, and at least one seat backrest reclining assembly. The backrest reclining assembly has an axis of rotation and includes a base, a rotating latching mechanism, and a reclining arm. The reclining arm is fixedly mounted to the seat backrest. The rotating latching mechanism is mounted between the reclining arm and the base to define an axis of rotation such that the reclining arm and the seat backrest may be operatively and selectively rotated relative to the base about the axis of rotation. A pivot arm is mounted to the base and has a pivot axis point disposed at a predetermined distance from the axis of rotation of the reclining assembly. A locking arm having a first locking surface and a second locking surface is rotatively mounted to the pivot arm coaxial to the axis of rotation of the reclining assembly. The locking arm is selectively movable to rotate between a locked position and an unlocked position. A support arm is also fixedly mounted to the seat bottom and rotatively mounted to the pivot arm at the pivot axis point such that the pivot arm and the seat backrest may be rotated about the pivot axis point between an upright position and a folded position. The support arm provides a first locking point such that when the pivot arm and the seat backrest are in the upright position, the first locking surface of the locking arm is engaged at the first locking point and the seat backrest is locked upright. The support arm further provides a second locking point such that when the pivot arm and the seat backrest are in the folded position, the second locking surface of the locking arm is engaged at the second locking point and the seat backrest is locked folded.

The present invention incorporates and integrates a pivoting mechanism, a pivoting lock mechanism, and a reclining mechanism to provide a compact and efficient backrest mechanism that avoids intruding into the seating area. The present invention also provides these features in a universal device that may be employed on a wide variety of vehicle seats and in a wide variety of vehicles.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
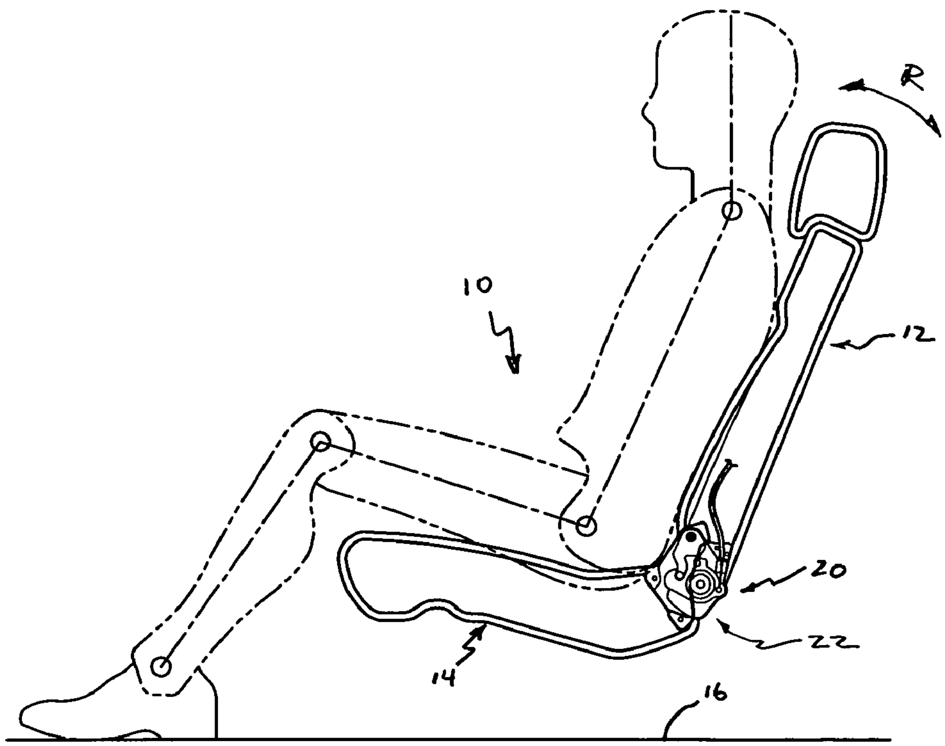
FIG. 1 is a side view of a seat assembly of the present invention in the upright position allowing for a reclining movement.

A vehicle seat assembly having a having a backrest locking assembly of the present invention is generally indicated as 10 in FIG. 1 where like numerals are employed to designate like structure throughout the figures. The seat assembly 10 includes a seat backrest generally indicated at 12 and a seat bottom generally indicated at 14. The seat bottom 14 is mounted to the floor 16 of a vehicle in a manner conventionally known in the art. It should be appreciated by those having ordinary skill in the art that the seat 10 may be either manually adjustable with respect to the vehicle floor 16 or it may be power adjustable. Either arrangement selectively allows the operator to move the entire seat assembly to any of a wide variety of positions in fore and aft movement and in seat tilt. It should be further appreciated that the construction of the frame of the seat (not shown) forms no part of the present invention and is therefore not part of the discussion herein. The seat backrest 12 is operatively mounted to the seat bottom 14 by a backrest locking assembly generally indicated at 20. The backrest locking assembly 20 provides for both a reclining movement of the vehicle seat 10, as indicted by the arrow "R" in FIG. 1, and a seat backrest folding movement as indicated by the arrow "F" in FIG. 2. Additionally, the present invention locks the backrest folding movement in both the down and folded position (FIG. 2) and in the upright position (FIG. 1) while continuing to allow for the separate reclining movement.

Figure 3:
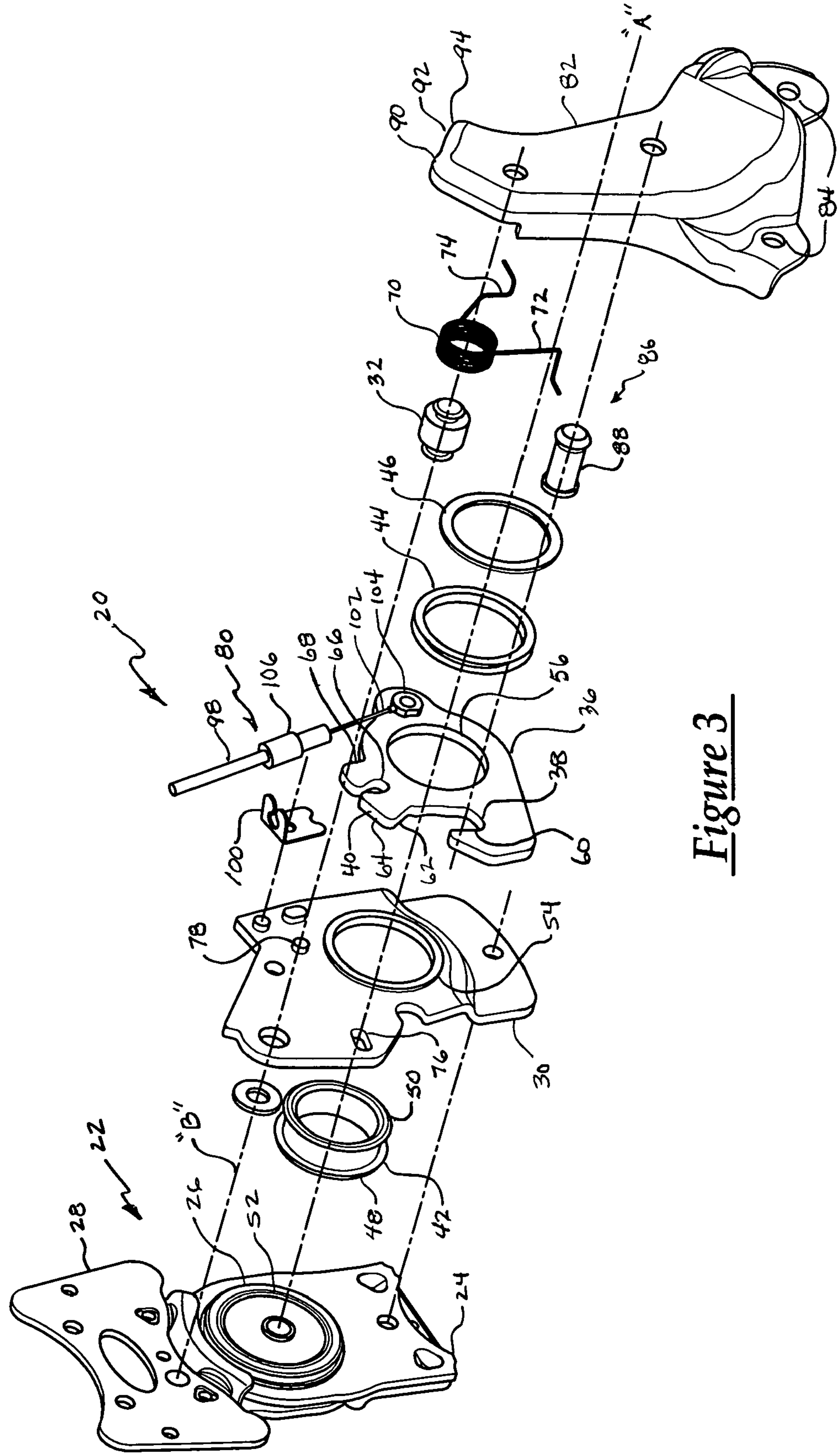
FIG. 3 is an exploded perspective view of the backrest locking assembly of the present invention.

To provide the seat backrest movements, the seat assembly 10 further includes at least one seat backrest reclining assembly, generally indicated at 22. As best shown in FIG. 3, the backrest reclining assembly 22 has a base 24, a rotating latching mechanism 26, and a reclining arm 28. The reclining arm 28 is fixedly mounted to the seat backrest 12. The rotating latching mechanism 26 is mounted between the reclining arm 28 and the base 24 to define an axis of rotation "A" such that the reclining arm 28 and the seat backrest 12 may be operatively and selectively rotated relative to the base 24 about the axis of rotation "A". It should be appreciated that the reclining assembly 22 may be any one of a variety of known reclining assemblies currently in use in vehicle seat applications. However, in the preferred embodiment of the present invention the seat backrest reclining assembly 22 is a rotary-cam type reclining assembly of the type described in U.S. Pat. No. 6,149,235 issued Nov. 21, 2000 and assigned to the assignee of the present invention. The disclosure of the '235 patent is incorporated herein by reference. It should also be appreciated that the mounting of the reclining arm 28 to the seat backrest 12 is not limited by the design of the seat backrest itself and may be mounted to a wide variety of vehicle seat backrests.

The seat 10 also includes a pivot arm 30 mounted to the base 24 of the reclining assembly 22. The pivot arm 30 has a pivot axis point "B" disposed at a predetermined distance from the axis of rotation of the reclining assembly "A". The pivot axis point "B" is defined by a pivot pin 32 that is mounted to the pivot arm 30. The seat 10 further includes a locking arm 36 rotatively mounted to the pivot arm 30 and having a first locking surface 38 and a second locking surface 40. The locking arm 36 is mounted coaxial to the axis of rotation "A" of the reclining assembly 22 and is selectively movable to rotate between a locked position and an unlocked position. The locking arm 36 and its locked and unlocked positions will be discussed in greater detail below.

With continuing reference to FIG. 3, the locking arm 36 is mounted to the pivot arm 30 and the reclining assembly 22 with an inner support sleeve 42, an outer support ring 44, and a retainer 46. The terms inner and outer used herein are relative and relate to the named components in regard to their proximate positions from the seat bottom and seat backrest. Thus, as illustrated in FIG. 3, the inner components refer to those generally oriented to the left (closest to the seat backrest) with the outer components generally oriented to the right (farther away from the seat backrest). The locking arm 36 is rotatively mounted to the pivot arm 30 and the base 24 of the reclining assembly 22 by the inner support sleeve 42, the outer support ring 44, and the retainer 46. The inner support sleeve 42 has an inner lip 48 and an outer lip 50. The inner lip 48 of the inner support sleeve 42 is supported in an annular groove 52 that is formed in the base 24 of the reclining assembly 22. The annular groove 52 is also formed as part of the rotating latching mechanism 26 and is thereby radially centered about the reclining assembly axis "A". The inner support sleeve 42 passes through and extends outward from a circular bore 54 in the pivot arm 30. The locking arm 36 has a central bore 56, which receives the inner supporting sleeve 42 and rests on the outer lip 50. The outer support ring 44 fits into the central bore 56 of the locking arm 36 opposite the inner support sleeve 42 and the retainer 46 fits within the outer support ring 44 so as to retain the locking arm 36 on the inner support sleeve coaxial to axis "A" of the reclining assembly 22. It should be appreciated that the retainer 46 may be of any of a variety of known retaining rings or clips, such as a "snap-ring" or "cir-clip" for example.

The first locking surface 38 of the locking arm 36 is further defined as a hook shaped opening 60, and the second locking surface 40 is further defined as an extending tab 62 with a flat locking face 64. The extending tab 62 of the locking arm 36 also has a central slot 66 and a trailing edge 68. A biasing member 70 formed as a wound spring having two tension legs 72 and 74 is disposed about the pivot pin 32. One tension leg 72 is retained and held stationary in an opening 76 in the pivot arm 30 and the other tension leg 74 is retained in the central slot 66 of the locking arm 36 to providing torsional biasing force. Thus, as shown in the figures, the biasing member 70 causes the locking arm 36 to be biased in a counter-clockwise rotational direction. A return pin 78 extends from the pivot arm 30, such that as the locking arm 36 is biased in the counter-clock wise direction, the trailing edge 68 of the extending tab 62 of the locking arm 36 contacts the return pin 78 to limit the rotation of the locking arm 36. It should be appreciated that the return pin 78 may be a separate pin mounted to the pivot arm 30 or may be a raised extrusion or other raised area created in the forming process for the pivot arm 30. A cable release assembly, generally indicated at 80 is employed to overcome the biasing force of the biasing member 70 and allow the seat backrest to be pivoted to the folded position. The cable release assembly 80 will be discussed in greater detail below.

Figure 2:
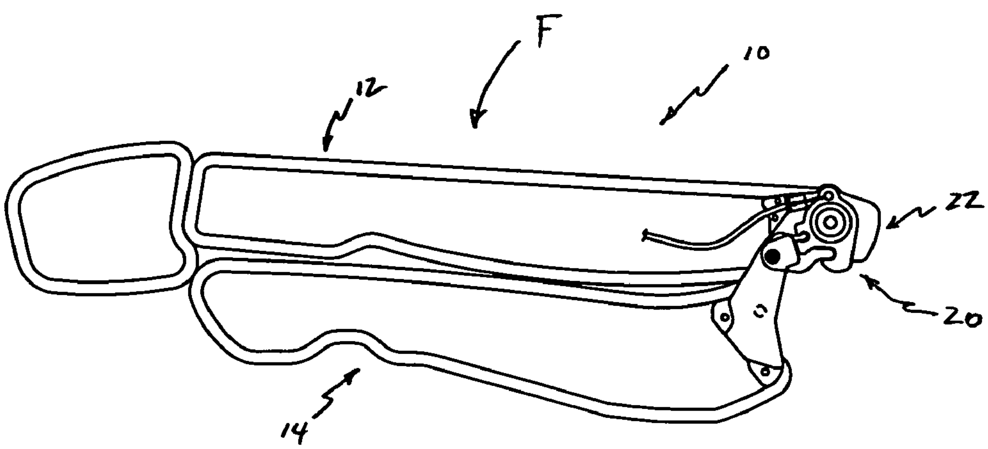
FIG. 2 is a side view of a seat assembly of the present invention folded forward using the pivoting and locking mechanisms.
Figure 4:
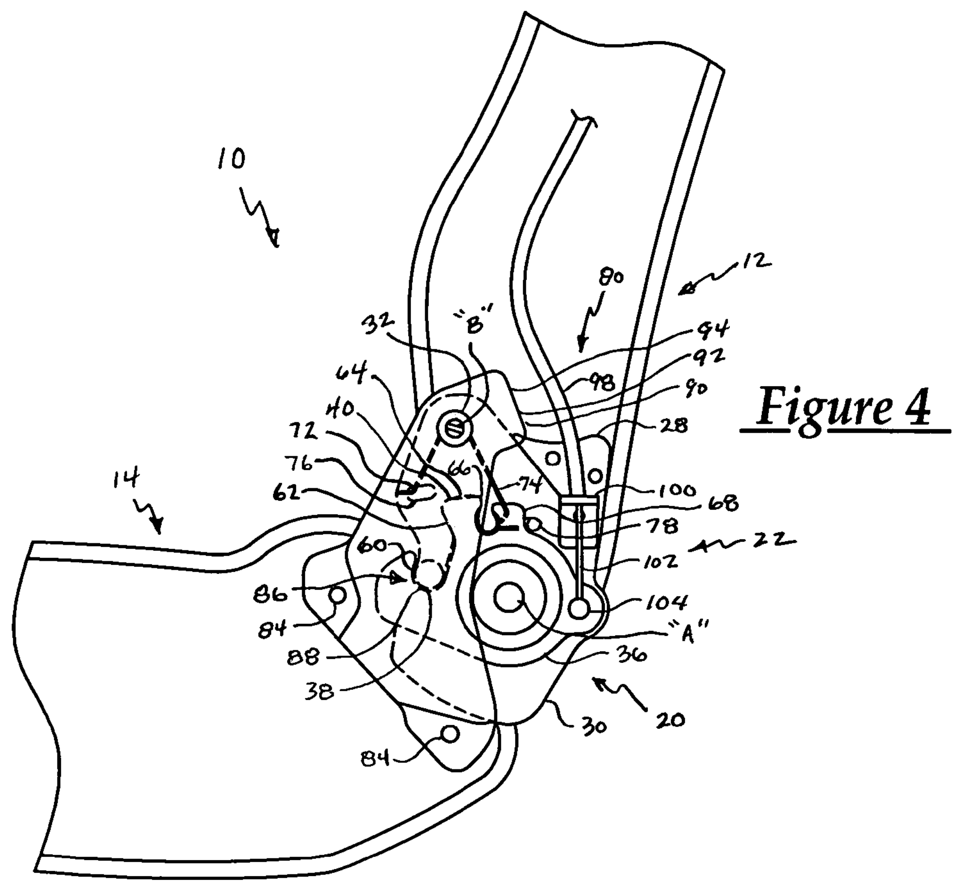
FIG. 4 is a side view of the backrest locking assembly of the present invention in the locked upright position allowing for a reclining movement.
Figure 5:
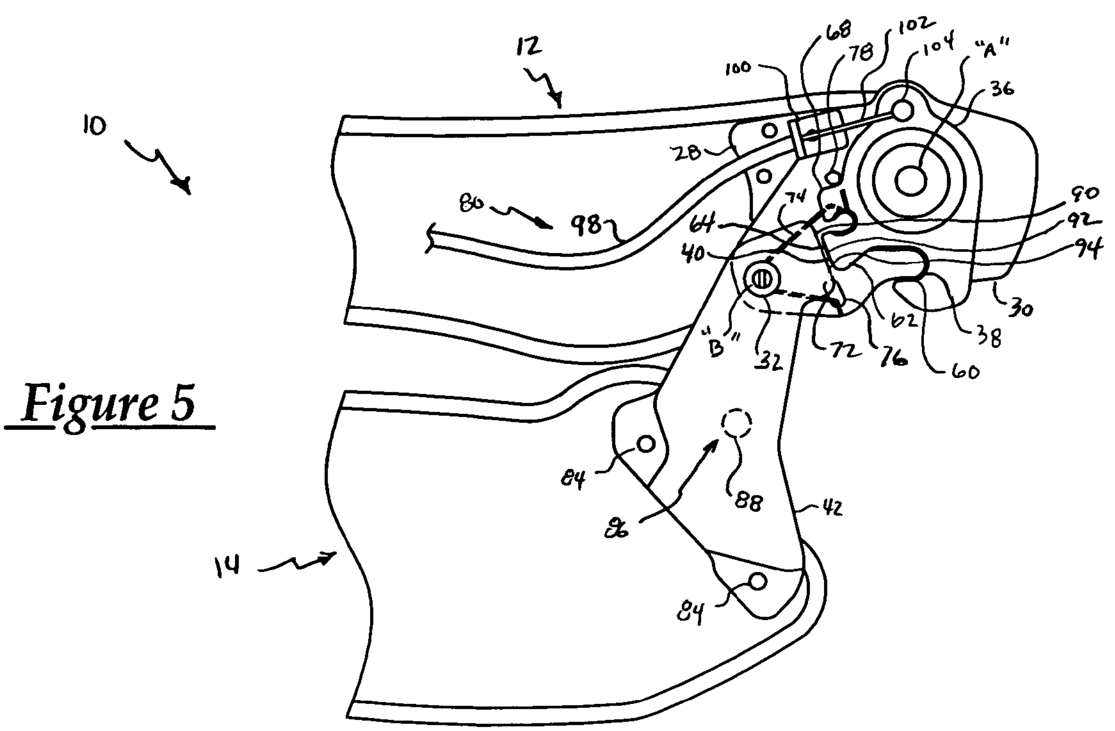
FIG. 5 is a side view of the backrest locking assembly of the present invention in the locked folded position.

A support arm 82 is fixedly mounted to the seat bottom 14 in a conventional manner at 84 and is rotatively mounted to the pivot arm 30 at the pivot axis point "B". More specifically, the support arm 82 is mounted to the pivot pin 32 such that the pivot arm 30 and the seat backrest 12 may be rotated about the pivot axis point "B" between an upright position (FIGS. 1 and 4) and a folded position (FIGS. 2 and 5). The support arm 82 provides a first locking point, generally indicated at 86 in FIG. 3 that is further defined by a locking pin 88, which interacts with the first locking surface 38 of the locking arm 36 as will be described in greater detail below. The support arm 82 further includes a terminal end 90 that has a stepped surface 92, which provides a second locking point 94 for the locking arm 36. It should be appreciated that the mounting of the support arm to the seat bottom 14 is not limited by the design of the seat bottom itself and may be mounted to a wide variety of vehicle seats.

Operationally, when it is desired to move the seat backrest from the upright position (FIG. 4) to the folded position (FIG. 5), the locking arm 36 is rotatively moved from the first locked position to the unlocked position by performing a pulling action of the cable release assembly 80. The cable release assembly 80 includes a cable sheath 98, a cable end bracket 100, an actuating cable 102, and a retaining pin 104. The actuating cable 102 further includes a proximate end 106 and a distal end (not shown). As shown in the figures, the proximate end 106 of the actuating cable 102 is mounted to the retaining pin 104, which is fixedly mounted to the locking am 60. The cable sheath 98 is retained in the cable end bracket 100, which is mounted to the pivot arm 30. Thus, a selective pulling action on the distal end of the actuating cable 102 relative to the cable sheath 98 causes the proximate end 106 and retaining pin 104 on the locking arm 36 to be drawn closer to the cable end bracket 100. This selective movement of the actuating cable 102 rotates the locking arm 36 causing the hook opening 60 on the first locking surface 38 of the locking arm 36 to be disengaged from the locking pin 88 on the pivot arm 30. The seat backrest 12 may then be rotated about the pivot pin 32 of the pivot arm 30 to the folded position. When the pulling action on the cable release assembly 80 is terminated, either prior to, or subsequent to, the seat backrest 12 reaching the folded position (FIG. 5), the biasing member 70 rotates the locking arm 36 back to its return (i.e. locking) position. This causes the flat locking face 64 of the extending ledge 62 found on the second locking surface 40 to engage the stepped surface 92 of the terminal end 90 on the support arm 82 thereby locking the seat backrest down in the folded position.

It should be appreciated that the distal end of the cable release assembly 80 maybe of any of a variety of known cable actuating fixtures, such as a lever, or t-handle, for example. It should also be appreciated that it may be desirable to connect the distal ends of more than one cable release assembly together if the particular application includes a seat backrest locking assembly of the present invention on both sides of the seat assembly 10, so that one actuation mechanism jointly operates the locking arms of both set backrest assemblies. A likewise pulling actuation of the cable release assembly 80 when the seat backrest 12 is in the folded position (FIG. 5), also selectively rotates the locking arm 36 out of the locked (return) position allowing the seat backrest to be rotated back about the pivot pin 32 of the pivot arm 30 to the upright position (FIG. 4). When the pulling action on the cable release assembly 80 is terminated, either prior to, or subsequent to, the seat backrest 12 reaching the upright position (FIG. 4), the biasing member 70 rotates the locking arm 36 back to its return (i.e. locking) position, so that the hook opening 60 of the locking arm 36 will engage the locking pin 88 on the pivot arm 30.

Figure 6:
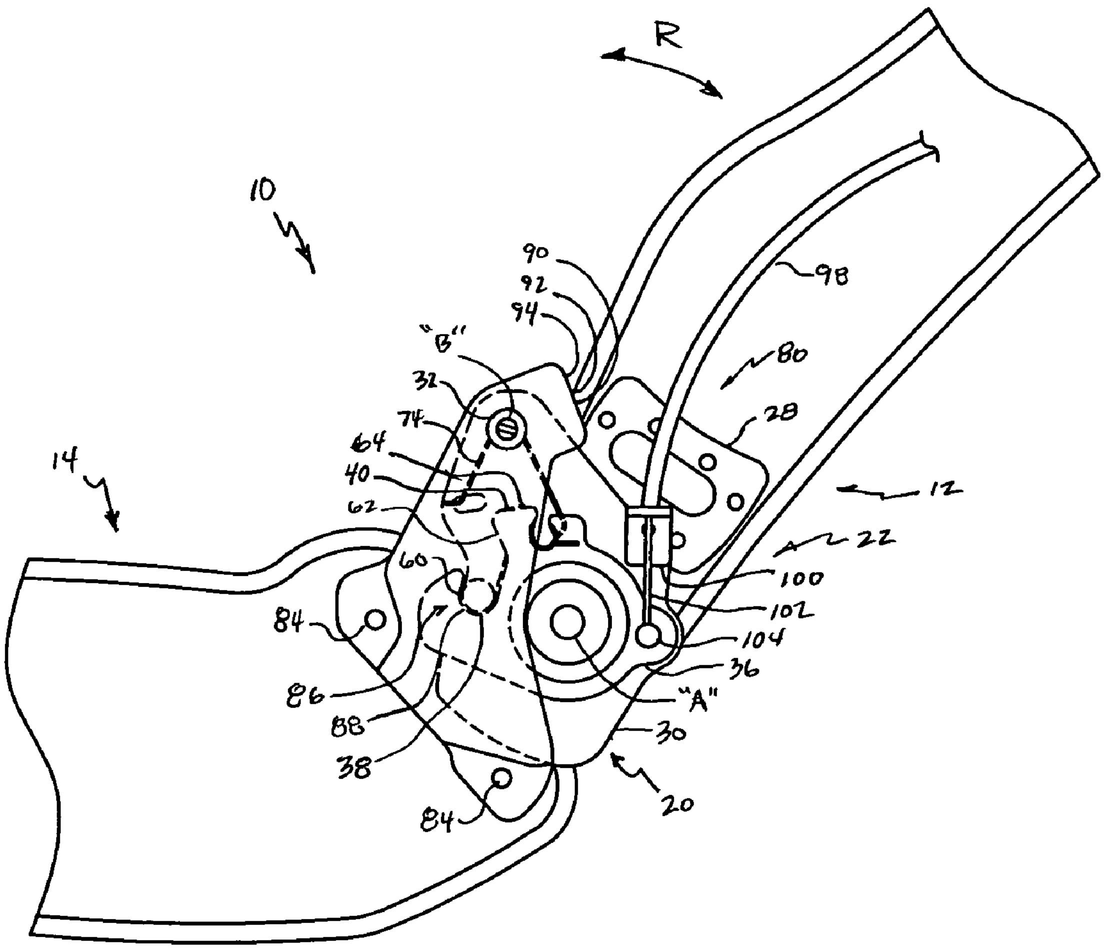
FIG. 6 is side view of the backrest locking assembly of the present invention in the locked upright position but illustrating a reclining movement.

The compact and efficient design of the backrest locking assembly of the present invention is further illustrated in FIG. 6 when compared to FIG. 4. FIG. 4 illustrates the fully upright position of the seat backrest 12 with the folding (pivoting) mechanism locked. FIG. 6 illustrates how the seat backrest 12 reclines about axis "A" and remains coaxial to the locking assembly 36 when the occupant selectively operates the rotating latching mechanism 26 of the backrest reclining assembly 22. When the backrest reclining assembly 22 is operated by the seat occupant, the seat backrest pivots about axis "A" and may be locked in any variety of reclining position. However, the pivot arm 30 and the support arm 82 remain in place and do not impinge upon the seating area or cause interference problems with vehicle and seat egress or ingress.

Thus, the seat backrest 12 may be readily reclined to any variable position allowed by the rotating latching mechanism 26 and when brought back to the upright position (shown in FIG. 4) the seat backrest 12 may be unlocked and easily folded down as illustrated in FIG. 5. Therefore, the seat assembly 10 and the backrest locking assembly 20 of the present invention overcome the drawbacks and disadvantage of the prior art seat pivoting and reclining mechanisms by providing an integrated and compact assembly that avoids intruding into the seating area. Additionally, the present invention provides reclining, pivoting, and locking features into a universal seat backrest assembly that may be employed on a wide variety of vehicle seats and in a wide variety of vehicles.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A vehicle seat assembly comprising:

a seat backrest;

a seat bottom mounted to the floor of a vehicle;

at least one seat backrest reclining assembly having a base, a rotating latching mechanism, and a reclining arm, said reclining arm fixedly mounted to said seat backrest, said rotating latching mechanism mounted between said reclining arm and said base to define an axis of rotation such that said reclining arm and said seat backrest may be operatively and selectively rotated relative to said base about said axis of rotation;

a pivot arm mounted to said base and having a pivot axis point disposed at a predetermined distance from said axis of rotation of said reclining assembly;

a locking arm rotatively mounted to said pivot arm coaxial to said axis of rotation of said reclining assembly having a first locking surface and a second locking surface, said locking arm selectively movable to rotate between a locked position and an unlocked position; and a support arm fixedly mounted to said seat bottom and rotatively mounted to said pivot arm at said pivot axis point, such that said pivot arm and said seat backrest may be rotated about said pivot axis point between an upright position and a folded position, said support arm providing a first locking point such that when said pivot arm and said seat backrest are in the upright position said first locking surface of said locking arm is engaged at said first locking point and said seat backrest is locked upright, said support arm further providing a second locking point such that when said pivot arm and said seat backrest are in the folded position said second locking surface of said locking arm is engaged at said second locking point and said seat backrest is locked folded.

2. A vehicle seat assembly as set forth in claim 1 wherein said first locking point for said locking arm is further defined as a locking pin.

3. A vehicle seat assembly as set forth in claim 2 wherein said support arm further includes a terminal end that has a stepped surface which presents a stop to said locking arm when said pivot arm and said seat backrest are in the folded position.

4. A vehicle seat assembly as set forth in claim 1 further including a biasing member adapted to bias said locking arm to remain in said first locking position unless selectively operated to rotate out of said first locked position and unlock said seat backrest when said seat backrest and said pivot arm are in the upright position.

5. A vehicle seat assembly as set forth in claim 4 further including a cable release assembly that is remotely operable to selectively rotate said locking arm out of said first locked position and unlock said seat backrest when said seat backrest and said pivot arm are in the upright position.

6. A vehicle seat assembly as set forth in claim 1 further including a biasing member adapted to bias said locking arm to remain in said second locking position when said seat backrest and said pivot arm are in the folded position unless selectively operated to rotate out of said second locked position and unlock said seat backrest.

7. A vehicle seat assembly as set forth in claim 6 further including a cable release assembly that is remotely operable to selectively rotate said locking arm out of said second locked position and unlock said seat backrest when said seat backrest and said pivot arm are in the folded position.

8. A backrest locking assembly for a vehicle seat comprising:

a backrest reclining assembly having a base, a rotating latching mechanism, and a reclining arm that is fixedly mounted to a backrest of a vehicle seat, said rotating latching mechanism mounted between said reclining arm and said base defining an axis of rotation such that said reclining arm and the seat backrest may be operatively and selectively rotated relative to said base about said axis of rotation;

a pivot arm mounted to said base and having a pivot axis point disposed at a predetermined distance from said axis of rotation of said reclining assembly;

a locking arm rotatively mounted to said pivot arm coaxial to said axis of rotation of said reclining assembly, said locking arm selectively movable to rotate between a first locking position and a second locking position; and a support arm fixedly mounted to a seat bottom and rotatively mounted to said pivot arm at said pivot axis point, such that said pivot arm and the seat backrest may be rotated about said pivot axis point between an upright position and a folded position, said support arm providing a first locking point such that when said pivot arm and the seat backrest are in the upright position said first locking surface of said locking arm is engaged at said first locking point and said seat backrest is locked upright, said support arm further providing a second locking point such that when said pivot arm and the seat backrest are in the folded position said second locking surface of said locking arm is engaged at said second locking point and the seat backrest is locked folded.

9. A backrest locking assembly as set forth in claim 8 wherein said first locking point for said locking arm is further defined as a locking pin.

10. A backrest locking assembly as set forth in claim 9 wherein said support arm further includes a terminal end that has a stepped surface which presents a stop to said locking arm when said pivot arm and the seat backrest are in the folded position.

11. A backrest locking assembly as set forth in claim 8 further including a biasing member adapted to bias said locking arm to remain in said first locking position unless selectively operated to rotate out of said first locked position and unlock said seat backrest when said seat backrest and said pivot arm are in the upright position.

12. A backrest locking assembly as set forth in claim 11 further including a cable release assembly that is remotely operable to selectively rotate said locking arm out of said first locked position and unlock said seat backrest when said seat backrest and said pivot arm are in the upright position.

13. A backrest locking assembly as set forth in claim 8 further including a biasing member adapted to bias said locking arm to remain in said second locking position when said seat backrest and said pivot arm are in the folded position unless selectively operated to rotate out of said second locked position and unlock said seat backrest.

14. A backrest locking assembly as set forth in claim 13 further including a cable release assembly that is remotely operable to selectively rotate said locking arm out of said second locked position and unlock said seat backrest when said seat backrest and said pivot arm are in the folded position.

* * * * *